(12) United States Patent
Steinke et al.

(10) Patent No.: US 12,552,339 B2
(45) Date of Patent: Feb. 17, 2026

(54) HYDRAULIC SYSTEMS AND METHODS FOR A VEHICLE WITH A COMMON PUMP SUPPLYING STEERING AND BRAKING FUNCTIONS

(71) Applicant: Oshkosh Corporation, Oshkosh, WI (US)

(72) Inventors: Jesse Steinke, Oshkosh, WI (US); Ryan Wolf, Oshkosh, WI (US); Chris Mills, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 416 days.

(21) Appl. No.: 18/214,862

(22) Filed: Jun. 27, 2023

(65) Prior Publication Data

US 2023/0415686 A1 Dec. 28, 2023

Related U.S. Application Data

(60) Provisional application No. 63/356,112, filed on Jun. 28, 2022.

(51) Int. Cl.
| | |
|---|---|
| *B60R 16/08* | (2006.01) |
| *B60L 50/60* | (2019.01) |
| *B60T 13/36* | (2006.01) |
| *B62D 5/07* | (2006.01) |
| *F15B 1/26* | (2006.01) |
| *F15B 15/18* | (2006.01) |
| *F15B 19/00* | (2006.01) |

(52) U.S. Cl.
CPC .............. *B60R 16/08* (2013.01); *B60L 50/60* (2019.02); *B60T 13/36* (2013.01); *B62D 5/075* (2013.01); *F15B 1/26* (2013.01); *F15B 15/18* (2013.01); *F15B 19/00* (2013.01)

(58) Field of Classification Search
CPC ......... B60L 50/60; B60T 13/36; B62D 5/075; B62D 5/092; B62D 5/30; B60K 17/356; B60K 17/358
See application file for complete search history.

(56) References Cited

U.S. PATENT DOCUMENTS

| | | | |
|---|---|---|---|
| 10,173,616 B2 * | 1/2019 | Adler | F04B 49/20 |
| 10,245,972 B2 * | 4/2019 | Healy | B60L 8/003 |
| 10,596,913 B2 * | 3/2020 | Healy | B60L 15/2018 |
| 10,766,478 B2 * | 9/2020 | Healy | B60W 30/18127 |
| 12,054,014 B2 * | 8/2024 | Borgmann | B60T 13/268 |
| 2017/0197599 A1 * | 7/2017 | Trifonov | B60T 8/329 |
| 2017/0253221 A1 | 9/2017 | Verhoff et al. | |
| 2019/0276102 A1 | 9/2019 | Zuleger et al. | |
| 2019/0351883 A1 | 11/2019 | Verhoff et al. | |

(Continued)

*Primary Examiner* — Jeffrey J Restifo
(74) *Attorney, Agent, or Firm* — Foley & Lardner LLP

(57) ABSTRACT

A hydraulic system includes a pump having a pump outlet, a tank configured to supply fluid to the pump, a hydraulic motor coupled to an air compressor that is configured to supply compressed air to an air brake, a steering gear having an inlet workport and an outlet workport, and a compressor bypass valve. The compressor bypass valve is selectively movable between a first position where fluid flow is provided from the pump outlet to both the hydraulic motor and the inlet workport of the steering gear and a second position where the fluid flow from the pump outlet bypasses the hydraulic motor and is supplied to the inlet workport of the steering gear.

20 Claims, 15 Drawing Sheets

(56) References Cited

U.S. PATENT DOCUMENTS

| | | | |
|---|---|---|---|
| 2020/0233410 A1* | 7/2020 | Burns | B60L 50/66 |
| 2020/0290237 A1 | 9/2020 | Steffens et al. | |
| 2021/0171137 A1 | 6/2021 | Zuleger et al. | |
| 2021/0276643 A1 | 9/2021 | Ellifson et al. | |
| 2021/0362696 A1 | 11/2021 | Verhoff et al. | |
| 2021/0362697 A1 | 11/2021 | Verhoff et al. | |
| 2021/0370893 A1 | 12/2021 | Verhoff et al. | |
| 2021/0370894 A1 | 12/2021 | Verhoff et al. | |
| 2021/0380085 A1 | 12/2021 | Verhoff et al. | |
| 2022/0144226 A1 | 5/2022 | Verhoff et al. | |
| 2022/0144227 A1 | 5/2022 | Verhoff et al. | |
| 2022/0176921 A1 | 6/2022 | Verhoff et al. | |
| 2022/0194333 A1 | 6/2022 | Verhoff et al. | |
| 2022/0194334 A1 | 6/2022 | Verhoff et al. | |
| 2022/0234554 A1 | 7/2022 | Verhoff et al. | |
| 2022/0234555 A1 | 7/2022 | Verhoff et al. | |
| 2022/0289152 A1 | 9/2022 | Verhoff et al. | |
| 2023/0070279 A1 | 3/2023 | Wheeler et al. | |
| 2023/0070769 A1 | 3/2023 | Wheeler et al. | |
| 2023/0074504 A1 | 3/2023 | Ellifson et al. | |
| 2023/0092520 A1 | 3/2023 | Verhoff et al. | |
| 2023/0150584 A1 | 5/2023 | Zeamer et al. | |
| 2023/0150763 A1 | 5/2023 | Haberlein et al. | |
| 2023/0191887 A1 | 6/2023 | Rausch et al. | |
| 2023/0192401 A1 | 6/2023 | Zeamer et al. | |
| 2023/0211705 A1 | 7/2023 | Zeamer et al. | |
| 2023/0311666 A1* | 10/2023 | Miller | B60L 3/12 |
| | | | 701/22 |
| 2023/0415686 A1* | 12/2023 | Steinke | F15B 1/26 |
| 2024/0270075 A1* | 8/2024 | Audhav | B60K 1/00 |
| 2025/0135899 A1* | 5/2025 | Foley | B60L 53/14 |

\* cited by examiner

HYDRAULIC SYSTEMS AND METHODS FOR A VEHICLE WITH A COMMON PUMP SUPPLYING STEERING AND BRAKING FUNCTIONS

CROSS-REFERENCE TO RELATED PATENT APPLICATIONS

This application claims the benefit of and priority to U.S. Provisional Application No. 63/356,112, filed on Jun. 28, 2022, the entire disclosure of which is hereby incorporated by reference herein.

BACKGROUND

The present disclosure relates generally to vehicles. More specifically, the present disclosure relates to a vehicle that includes a compressed air brake system.

SUMMARY

One embodiment relates to a hydraulic system that includes a pump having a pump outlet, a tank configured to supply fluid to the pump, a hydraulic motor coupled to an air compressor that is configured to supply compressed air to an air brake, a steering gear having an inlet workport and an outlet workport, and a compressor bypass valve. The compressor bypass valve is selectively movable between a first position where fluid flow is provided from the pump outlet to both the hydraulic motor and the inlet workport of the steering gear and a second position where the fluid flow from the pump outlet bypasses the hydraulic motor and is supplied to the inlet workport of the steering gear.

Another embodiment relates to an electrified vehicle that includes a chassis, two or more wheels coupled to the chassis, an energy storage device supported on the chassis, two or more drive motors, and a hydraulic system. Each of the drive motors is electrically coupled to the energy storage device and is configured to provide rotational energy to a respective one of the two or more wheels. The hydraulic system includes a pump having a pump outlet, a tank configured to supply fluid to the pump, a hydraulic motor coupled to an air compressor, a steering gear having an inlet workport and an outlet workport, and a compressor bypass valve. The air compressor is configured to supply compressed air to an air brake that is configured to selectively apply a braking force to the two or more wheels. The steering gear is coupled to the two or more wheels to control a steering direction of the two or more wheels. The compressor bypass valve is selectively movable between a first position where fluid flow is provided from the pump outlet to both the hydraulic motor and the inlet workport of the steering gear and a second position where the fluid flow from the pump outlet bypasses the hydraulic motor and is supplied to the inlet workport of the steering gear.

One embodiment relates to a method of controlling steering and braking functions on an electrified vehicle. The method includes supplying pressurized hydraulic fluid at a supply pressure from a pump to a hydraulic motor through a compressor bypass valve, powering, via the hydraulic motor using a first portion of the supply pressure, an air compressor that supplies compressed air to an air brake, and supplying a remaining portion of the supply pressure from the hydraulic motor to a steering gear.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

In general, conventional battery electric vehicle powertrain systems typically utilize two electric motors to separately power steering and braking functions. These conventional systems increase cost by requiring either two separately powered motors to control the steering and braking functions. According to an exemplary embodiment, the present disclosure overcomes these inefficiencies in conventional vehicle powertrain systems by providing a hydraulic system that drives both steering and braking functions on a vehicle using a common pump.

In some embodiments, the vehicle includes a pump that is in fluid communication with a hydraulic motor that powers an air compressor, and an outlet of the hydraulic motor is in fluid communication with a steering gear. In this way, for example, the pump supplies fluid flow to operate both the air compressor and the steering gear on the vehicle. In some embodiments, the hydraulic system includes a compressor bypass valve is selectively movable between a first bypass position and a second bypass position to selectively bypass the hydraulic motor and supply all flow to the steering gear. In some embodiments, the hydraulic system includes a load sense valve that is movable from a first position to a second position in response to a steering demand increasing a pressure at the workport of the steering gear to be greater than a load sense pressure threshold. In the second position, the load sense valve provides fluid communication between the pump and a bypass conduit to bypass the hydraulic motor and supply all flow to the steering gear.

Overall Vehicle

Figure 1:
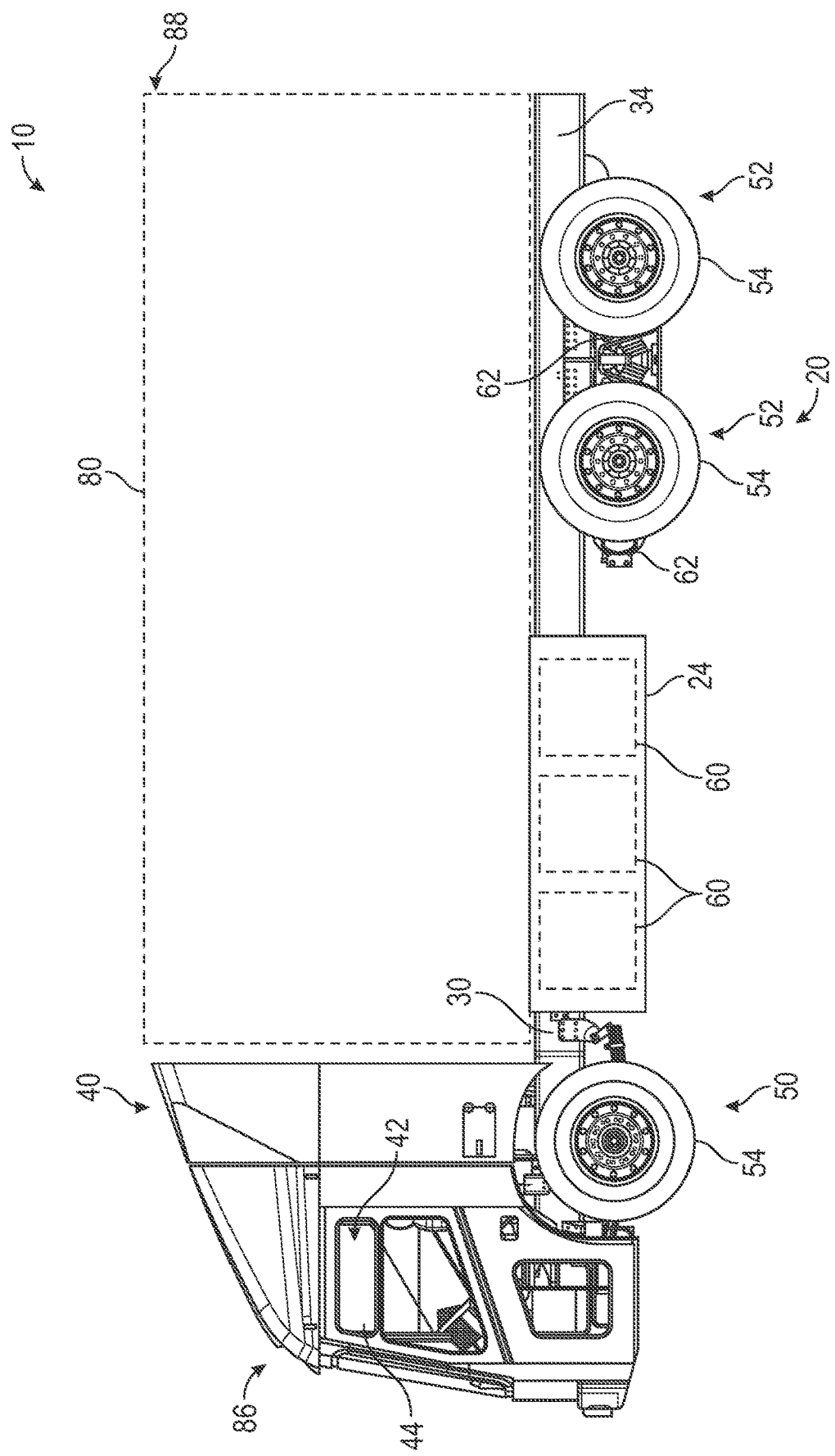
FIG. 1 is a left side view of a vehicle, according to an exemplary embodiment.
Figure 2:
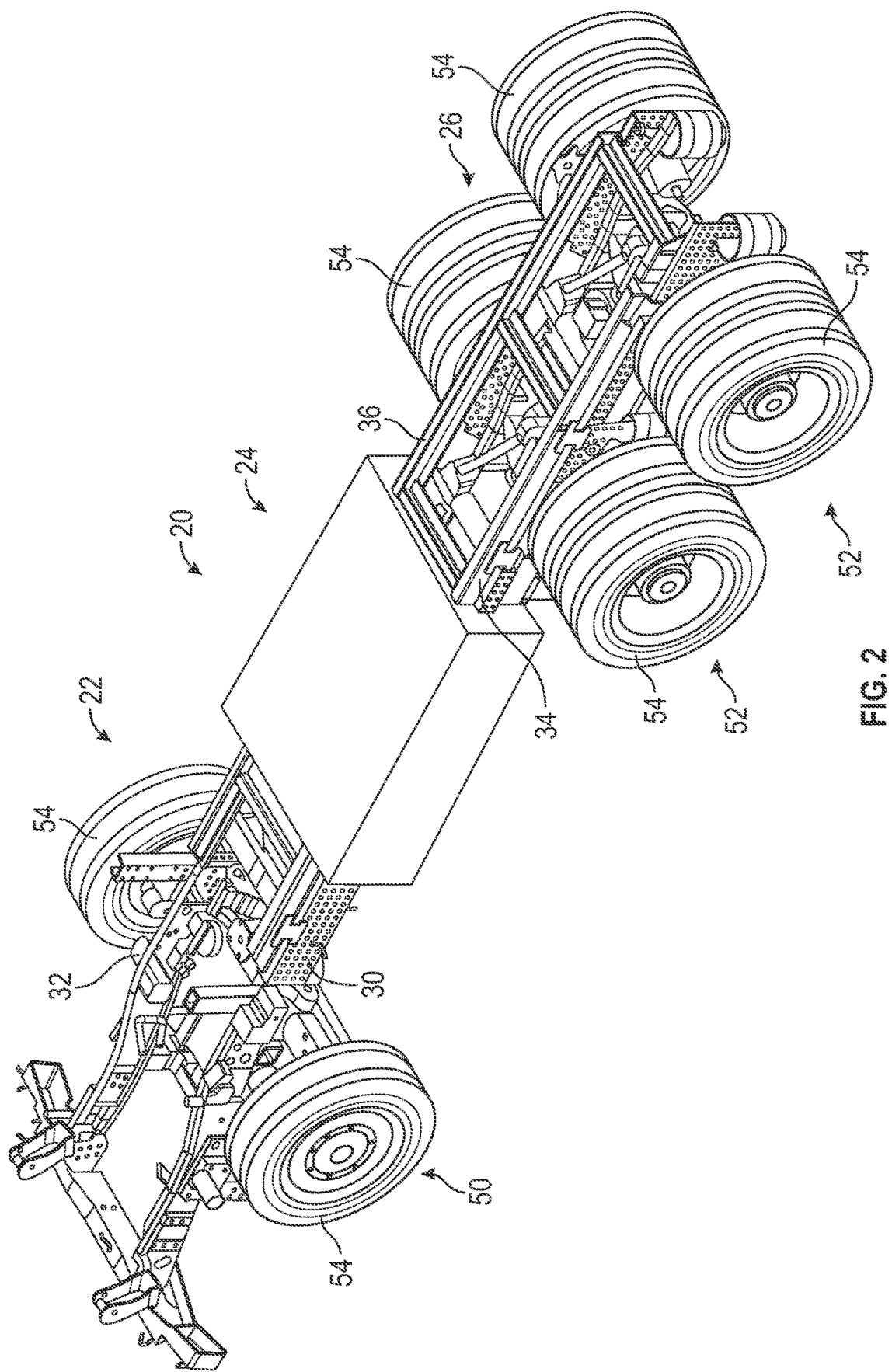
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
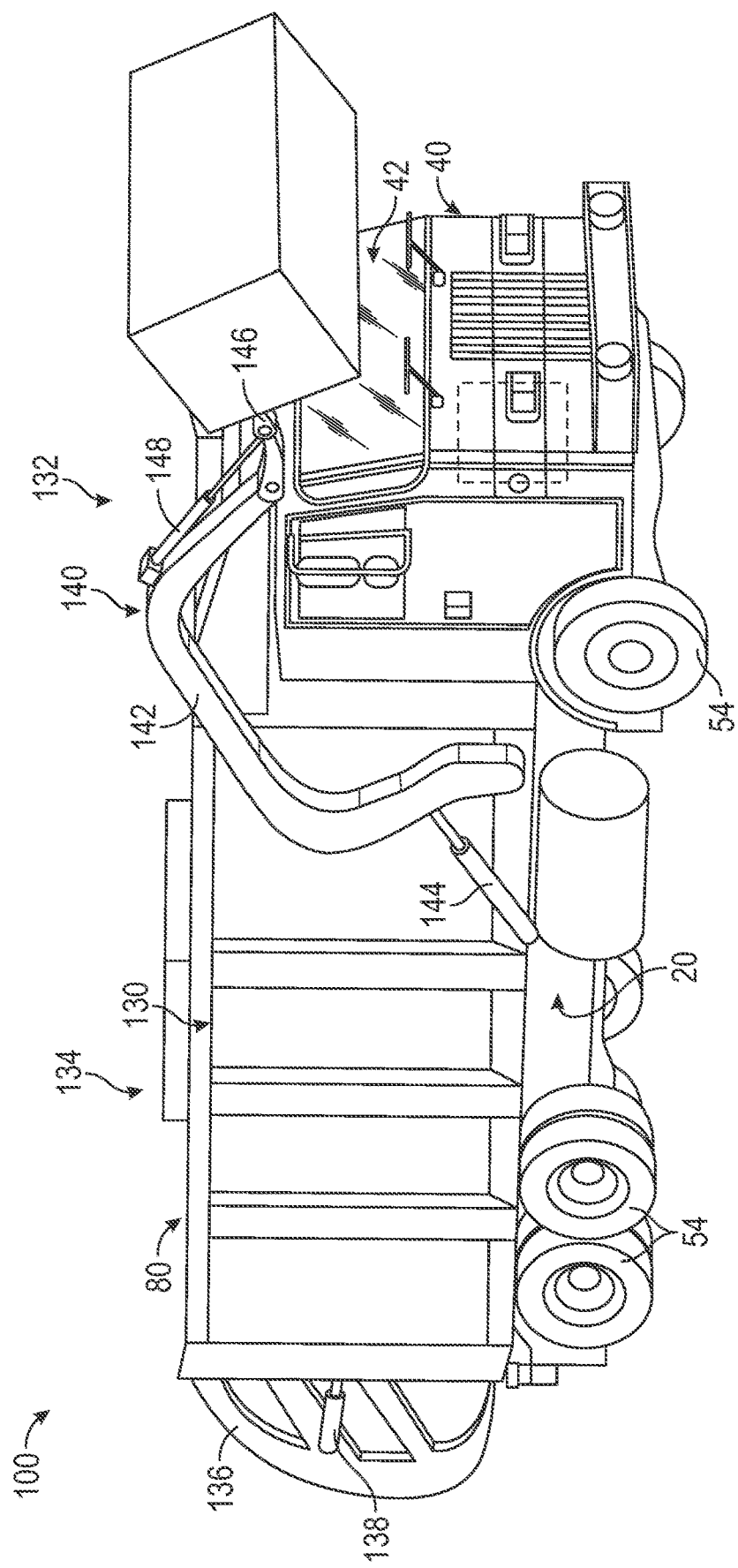
FIG. 3 is a perspective view of the vehicle of FIG. 1 configured as a front-loading refuse vehicle, according to an exemplary embodiment.
Figure 4:
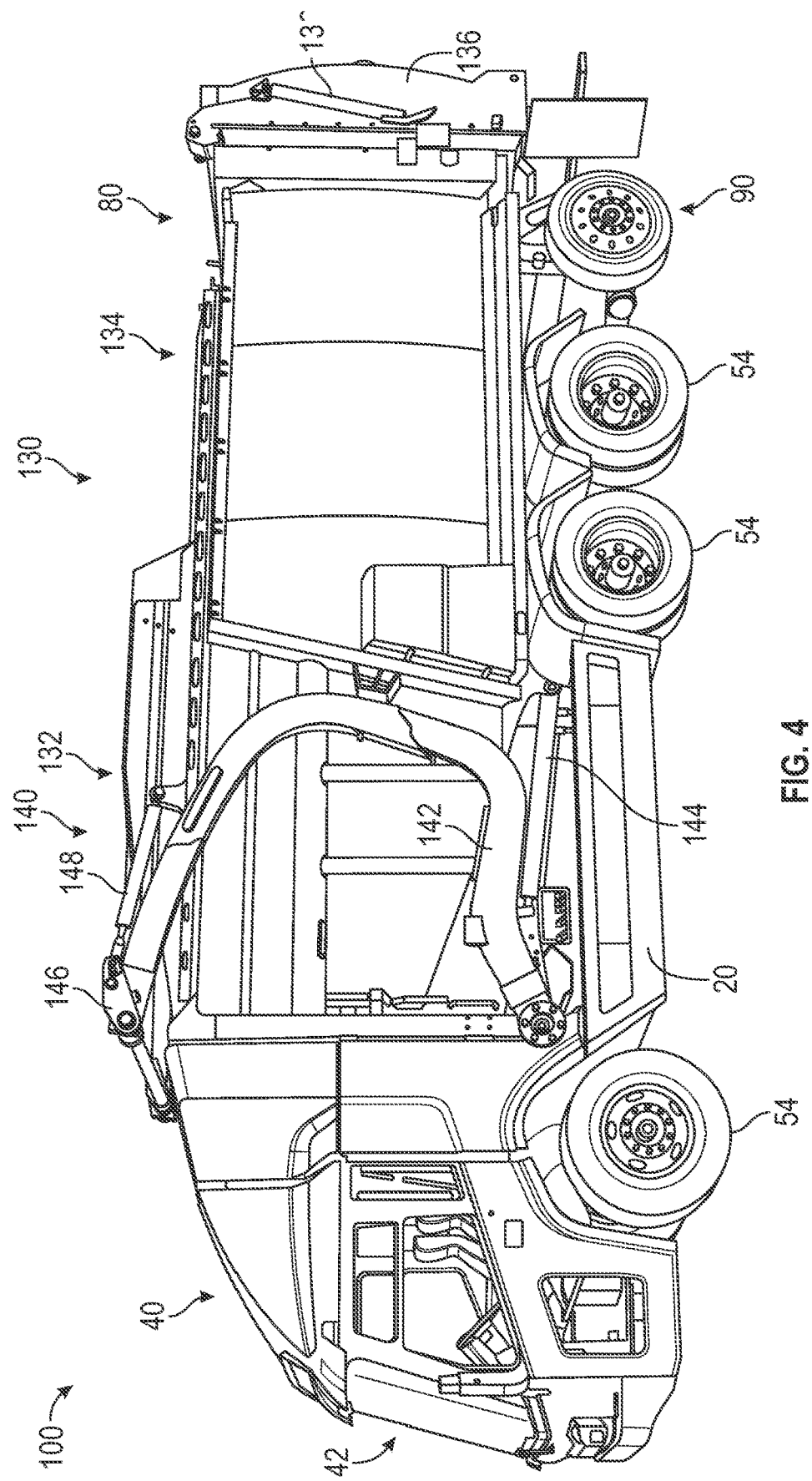
FIG. 4 is a left side view of the front-loading refuse vehicle of FIG. 3 configured with a tag axle.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
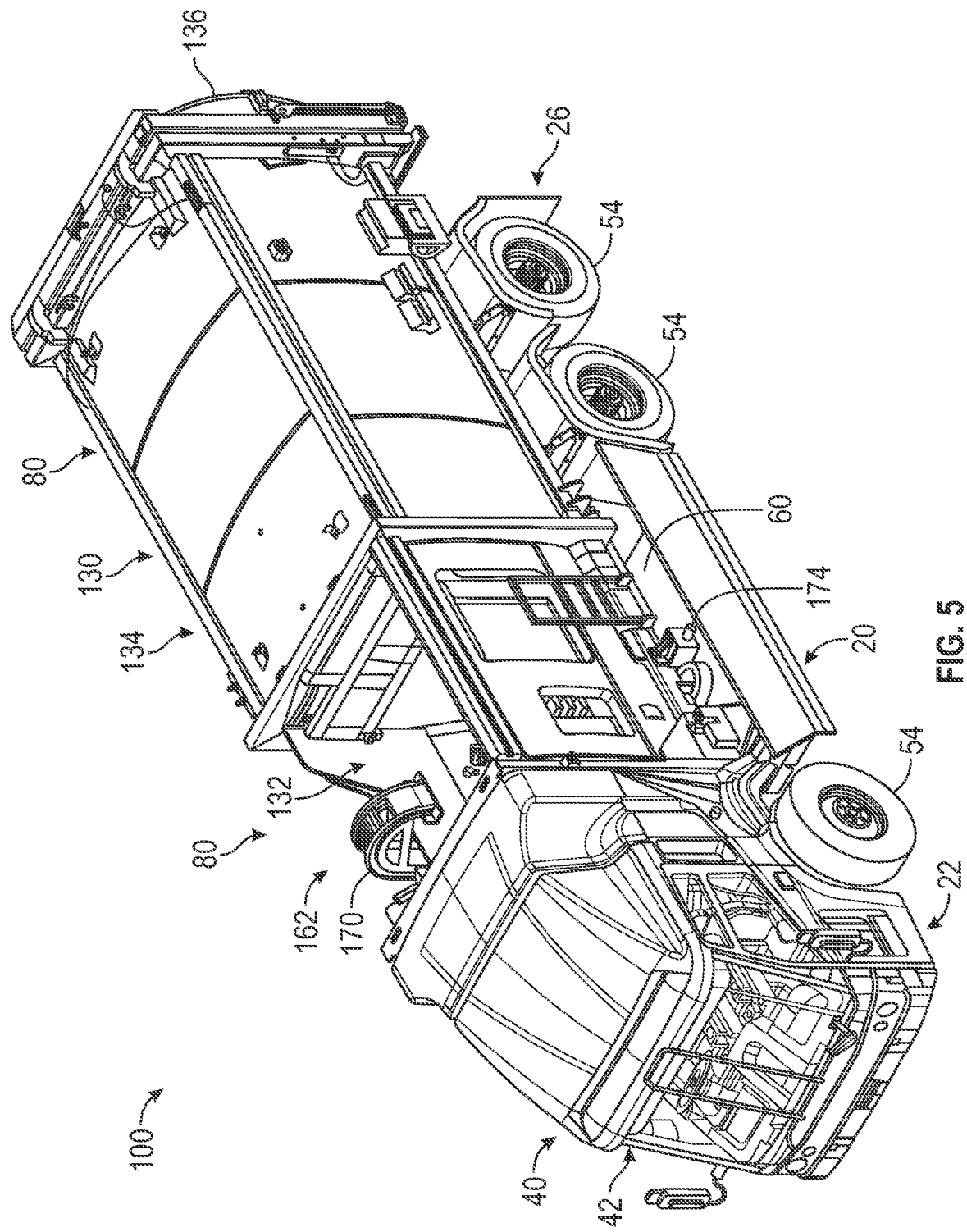
FIG. 5 is a perspective view of the vehicle of FIG. 1 configured as a side-loading refuse vehicle, according to an exemplary embodiment.
Figure 6:
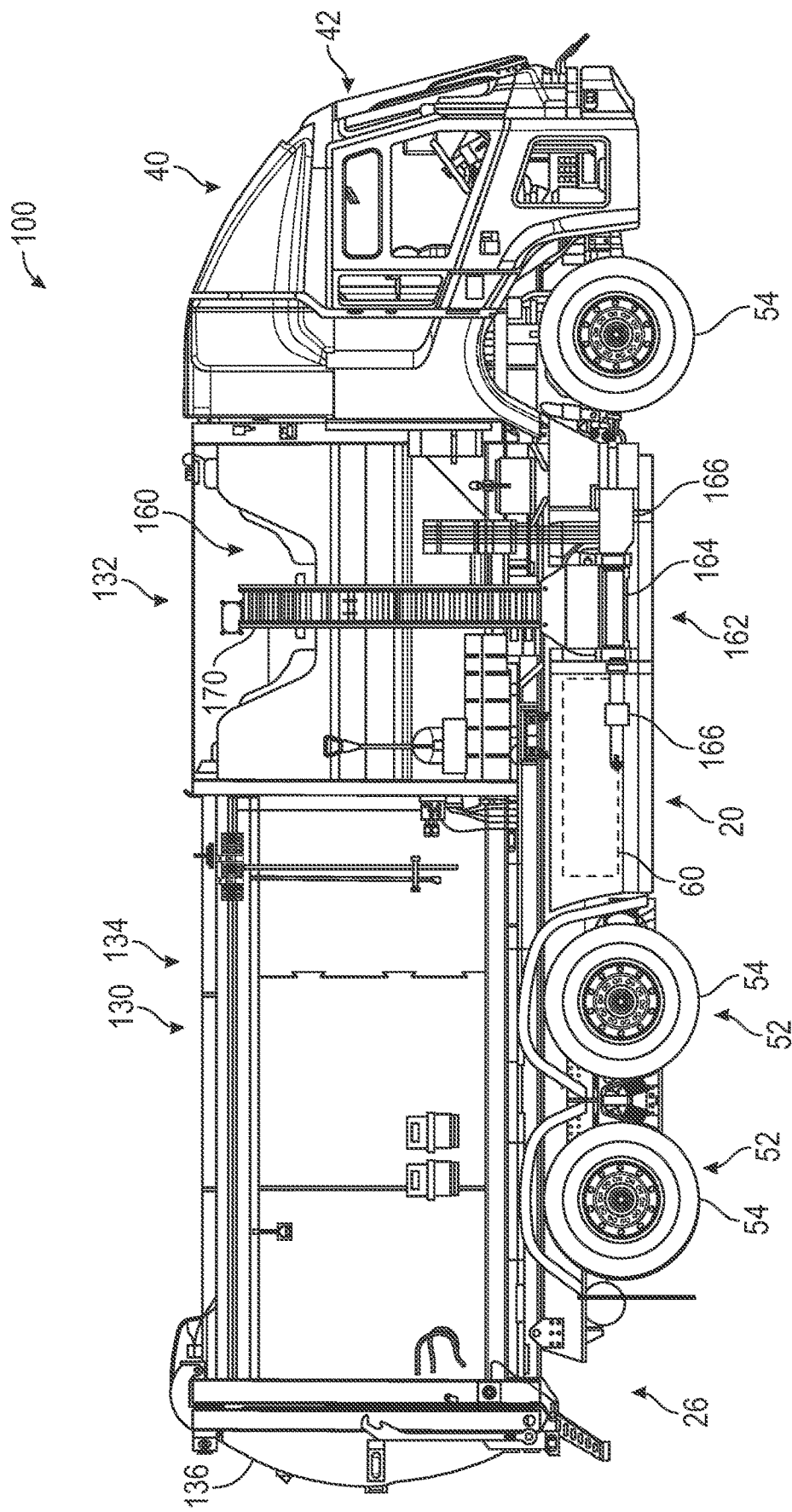
FIG. 6 is a right side view of the side-loading refuse vehicle of FIG. 5.
Figure 7:
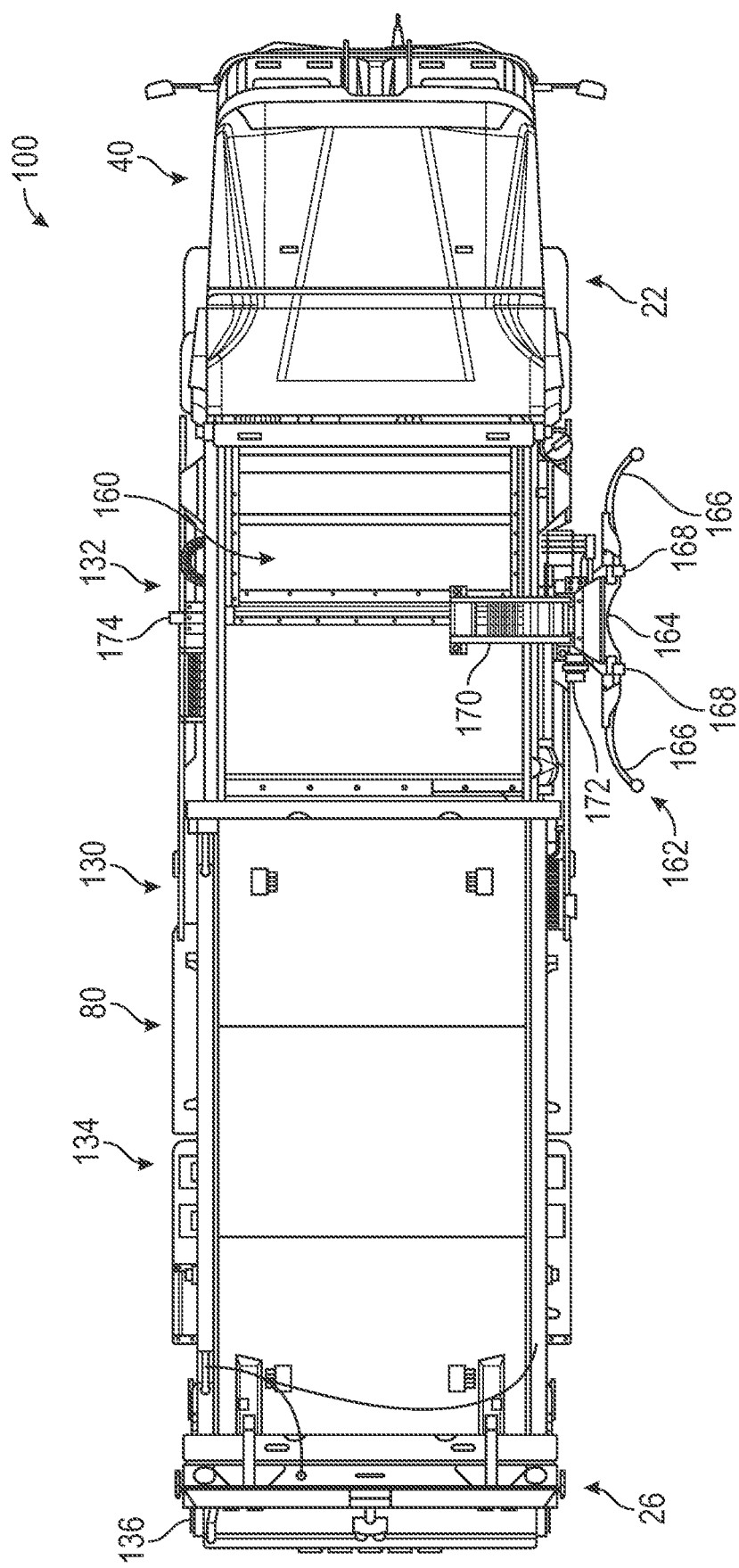
FIG. 7 is a top view of the side-loading refuse vehicle of FIG. 5.
Figure 8:
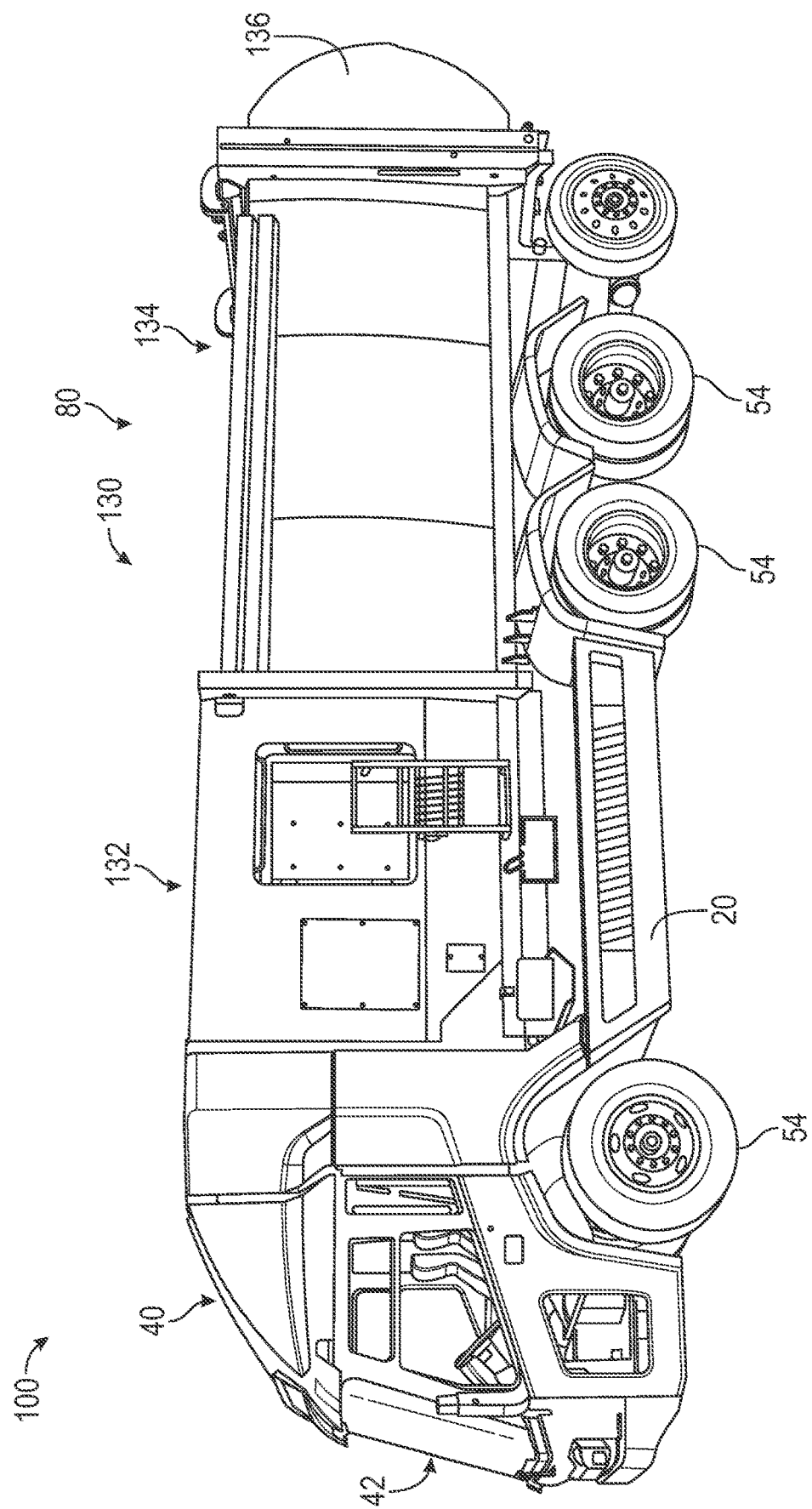
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
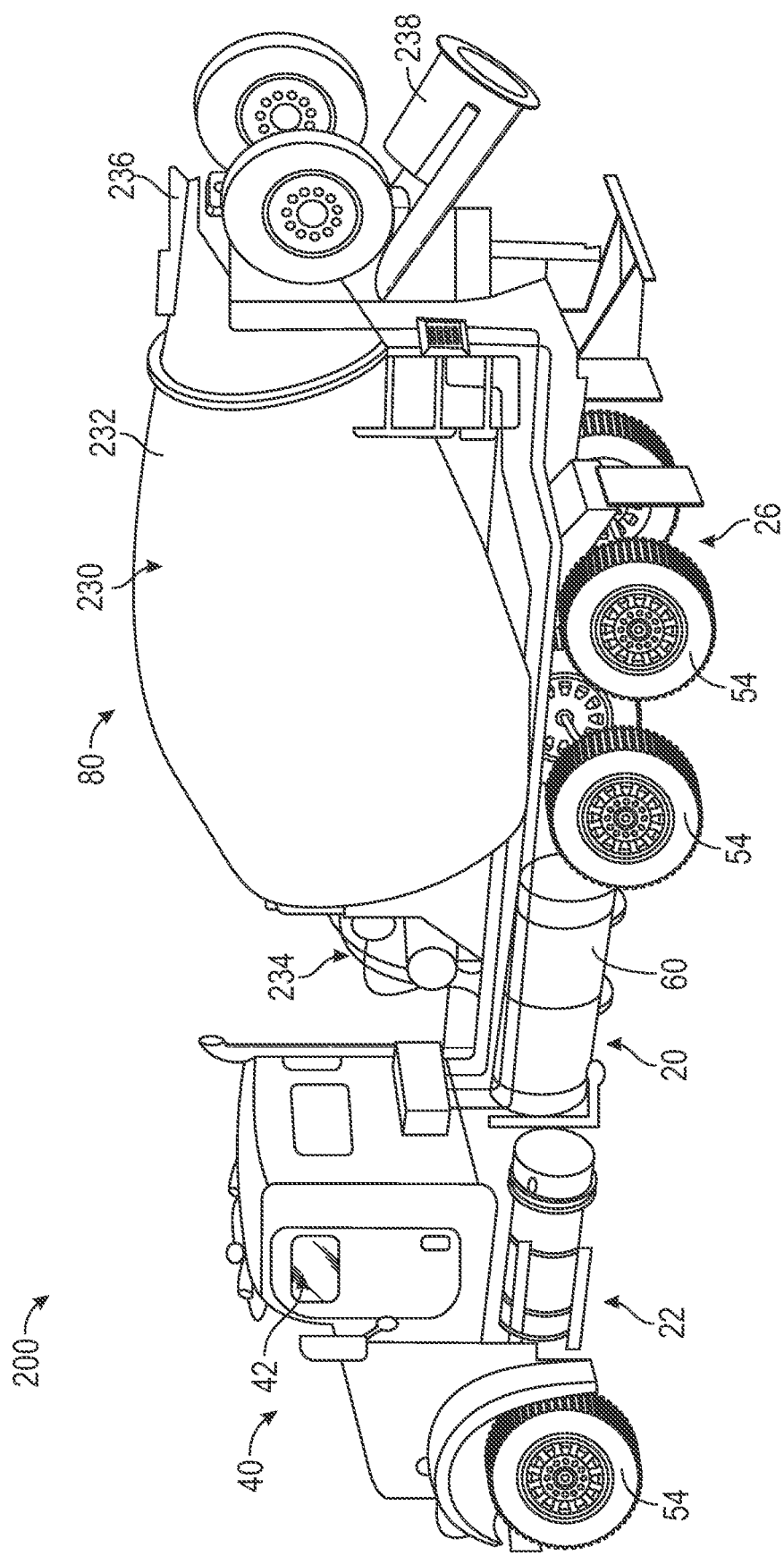
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
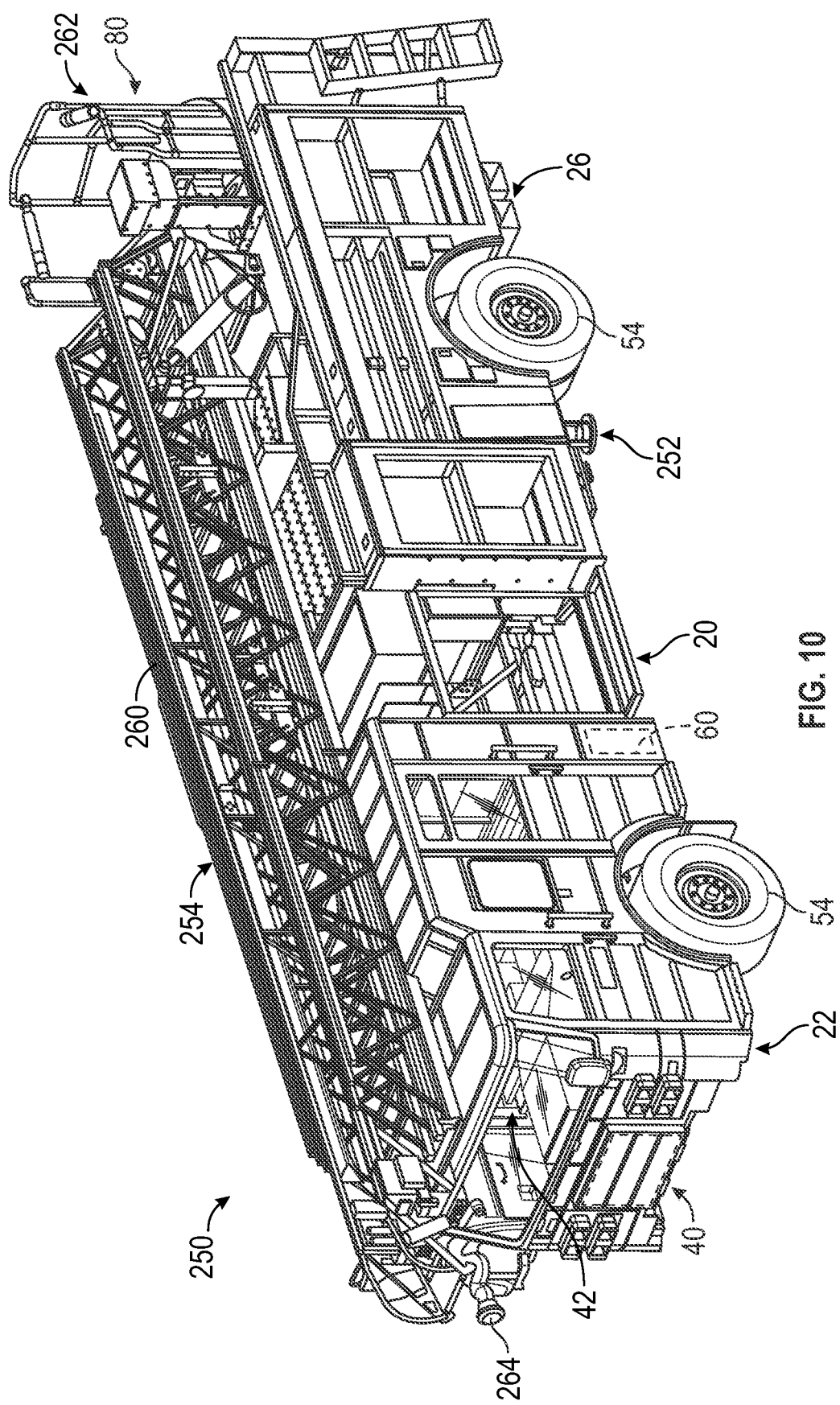
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
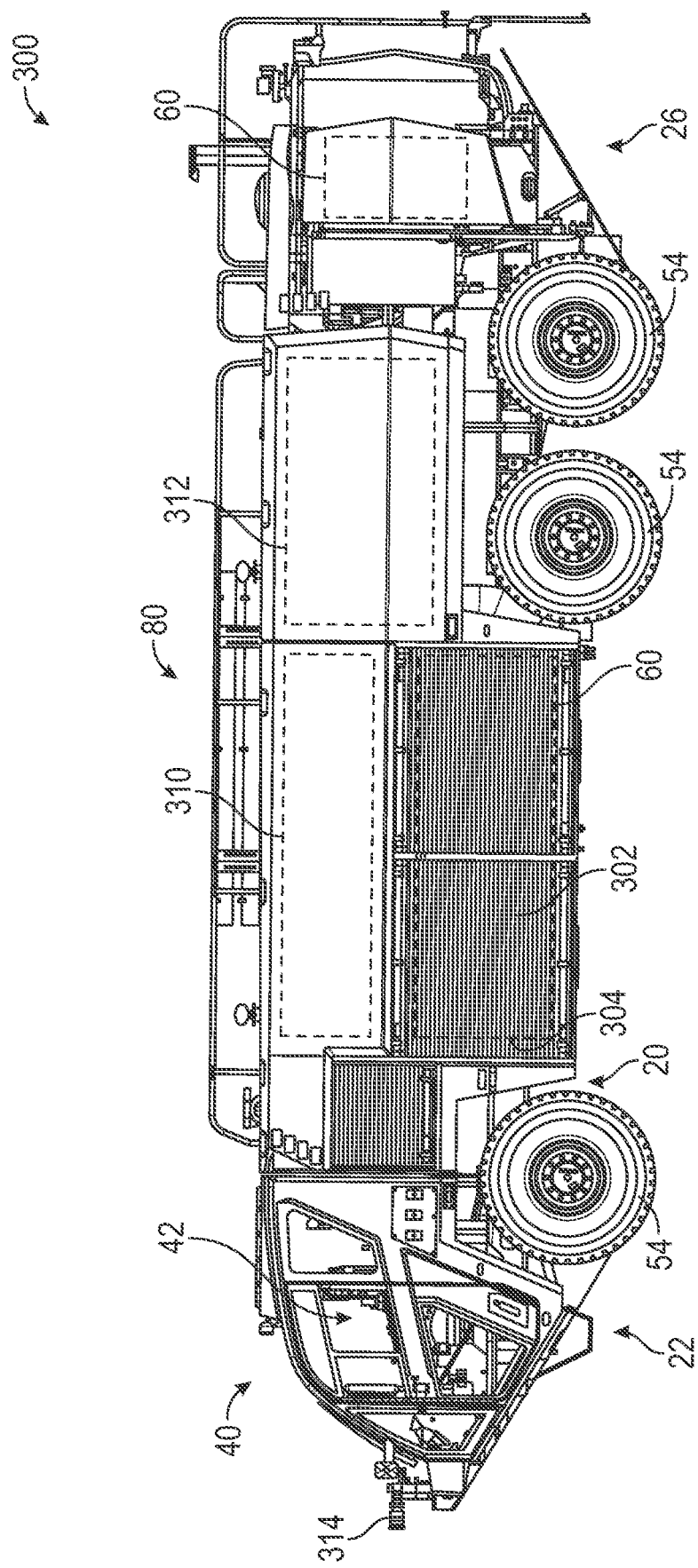
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
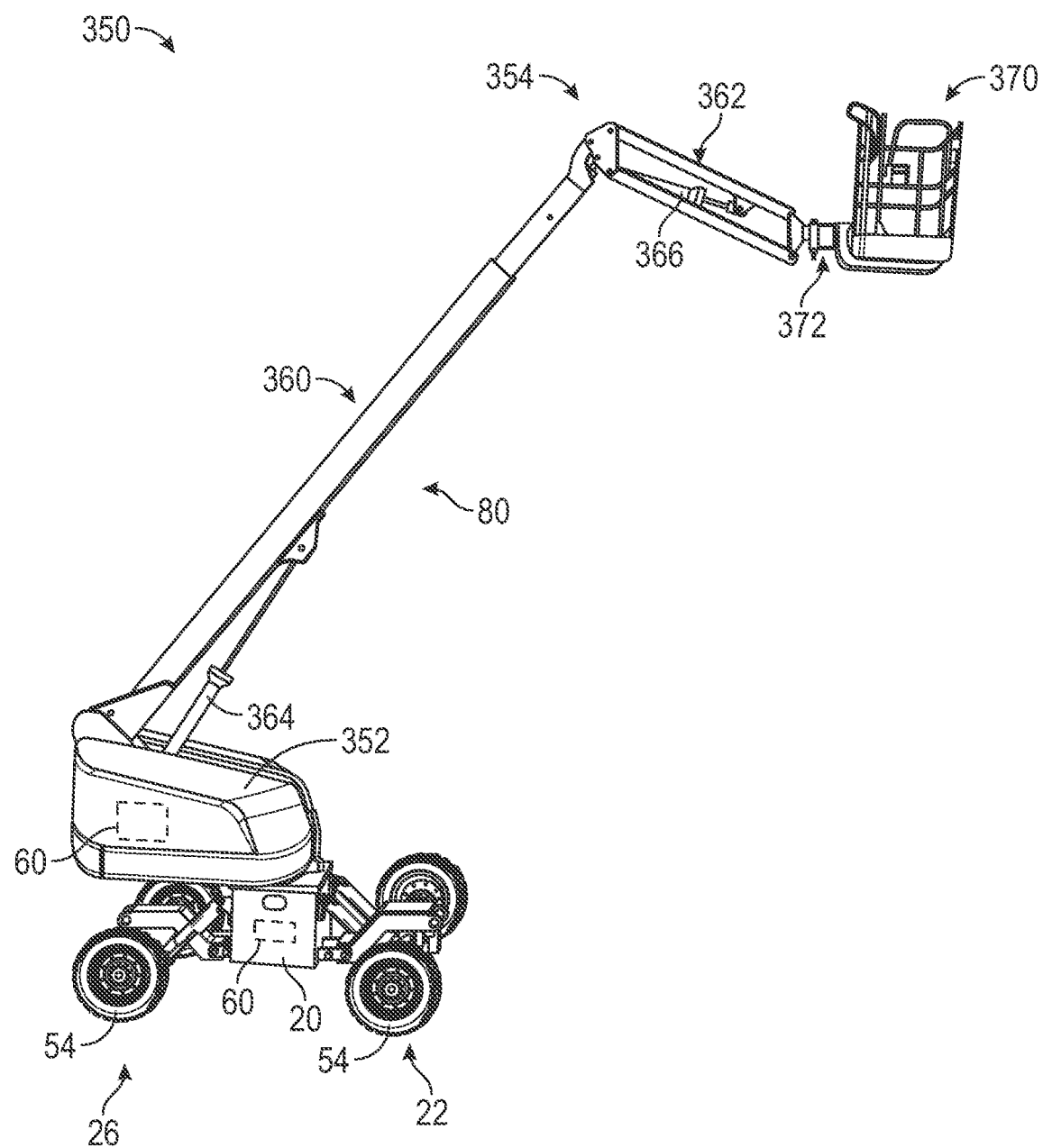
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may include structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
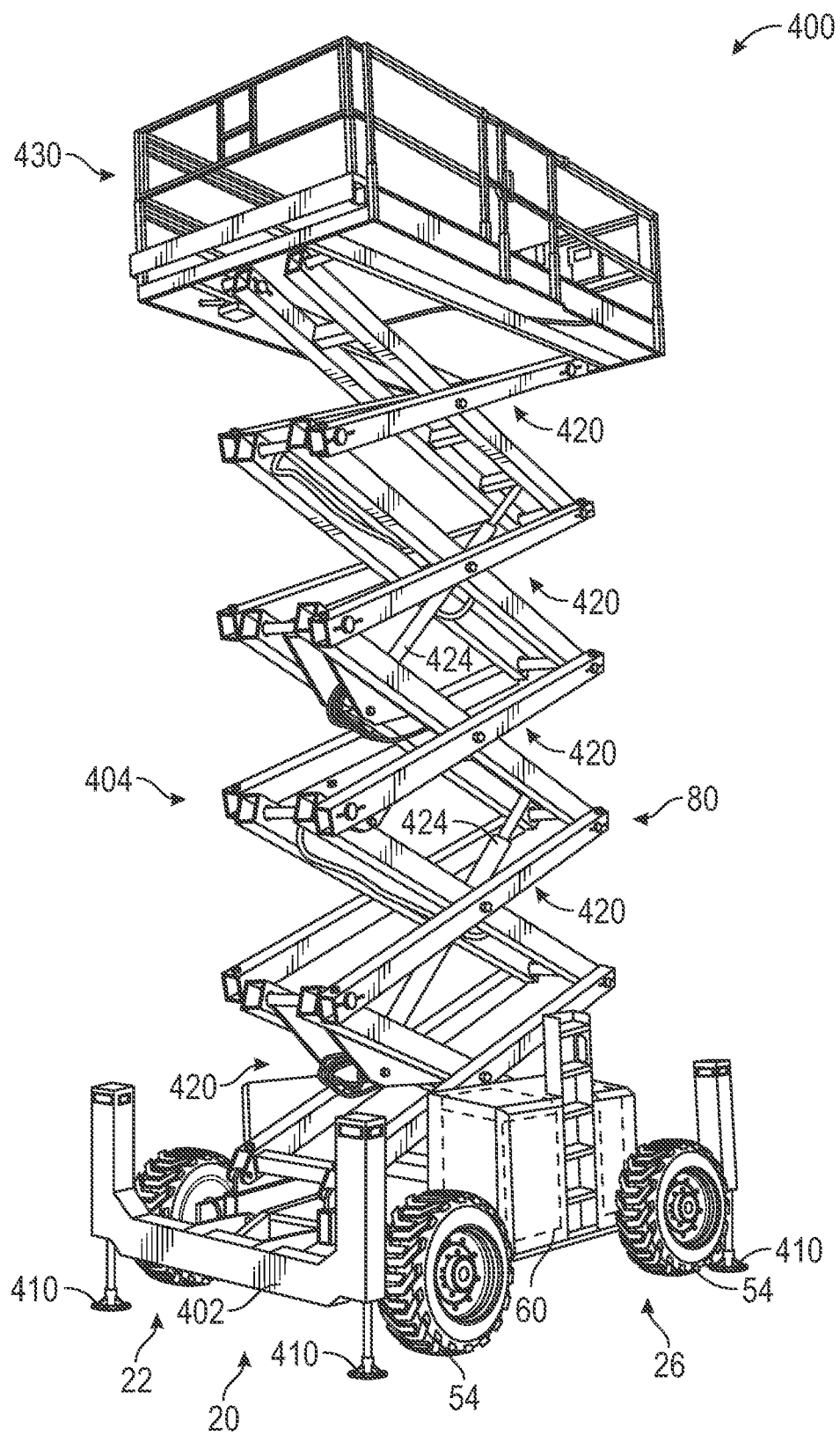
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Hydraulic System with a Common Pump for Braking and Steering Functions

The use of the terms "downstream" and "upstream" herein are terms that indicate direction relative to the flow of a fluid. The term "downstream" corresponds to the direction of fluid flow, while the term "upstream" refers to the direction opposite or against the direction of fluid flow.

In some embodiments, the vehicles 10, 100, 200, 250, 300, 350, 400 of FIGS. 1-13 are supplied with compressed air brakes and a steering gear. The compressed air brakes are used to provide braking functionality to the vehicles during operation, and the steering gear provides a hydraulically-assisted steering functionality to control the travel direction of the vehicle (e.g., lateral course movement). A hydraulic system is included on the vehicle to control the operation of the compressed air brakes and the steering gear (e.g., braking and steering functions) by supplying a hydraulic fluid (e.g., oil) that compresses air used to power the compressed air brakes and provides pressurized fluid to the steering gear.

Figure 14:
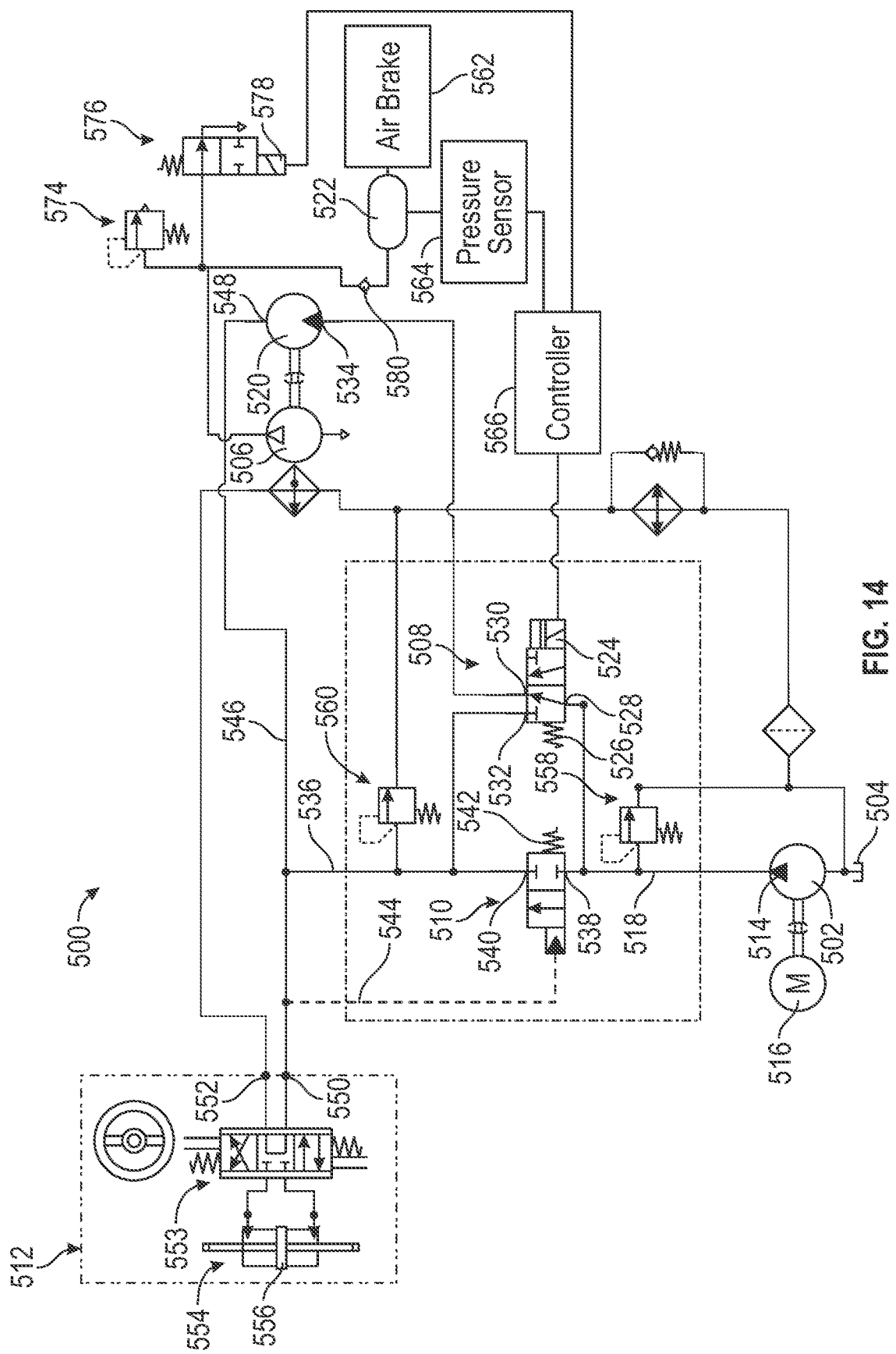
FIG. 14 is a schematic of a hydraulic system for a vehicle, according to an exemplary embodiment.

FIG. 14 illustrates a hydraulic system 500 for a vehicle (e.g., the vehicle 10, 100, 200, 250, 300, 350, 400) that includes a pump 502, a reservoir or tank 504, an air compressor 506, a compressor bypass valve 508, a load sense valve 510, and a steering gear 512. The pump 502 includes a pump outlet 514 and is powered by a motor 516 (e.g., an electric motor or an internal combustion engine). In some embodiments, the motor 516 is powered by the batteries 60. The motor 516 powers the pump 502 so that the pump 502 draws fluid (e.g., oil) from the tank 504 and furnishes the fluid under increased pressure to the pump outlet 514. The pump outlet 514 is in fluid communication with a supply passage 518.

The air compressor 506 is powered by a hydraulic motor 520 so that the air compressor 506 produces compressed air that is supplied to a reservoir 522 (e.g., fixed volume). In other words, the air compressor 506 is hydraulically powered. In general, the hydraulic motor 520 is configured to receive fluid flow from the pump 502 via the compressor bypass valve 508. In some embodiments, the compressor bypass valve 508 is an electrohydraulic control valve that includes a solenoid 524, a spring 526, a bypass inlet port 528, a first outlet port 530, and a second outlet port 532. The bypass inlet port 528 is in fluid communication with the supply passage 518 upstream of the load sense valve 510, the first outlet port 530 is in fluid communication with an inlet 534 of the hydraulic motor 520, and the second outlet port 532 is in fluid communication with a bypass passage or conduit 536.

In general, the compressor bypass valve 508 is movable between a first position and a second position to selectively bypass the hydraulic motor 520 and supply all fluid flow from the pump 502 to the steering gear 512 through the bypass passage 536. In some embodiments, the compressor bypass valve 508 is normally biased into the first position by the spring 526. In the first position, fluid communication is provided between the bypass inlet port 528 and the first outlet port 530 (i.e., between the pump outlet 514 and the inlet 534 of the hydraulic motor 520) and fluid communication is inhibited between the bypass inlet port 528 and the second outlet port 532 (i.e., between the pump outlet 514 and the bypass passage 536). In the second position, fluid communication is provided between the bypass inlet port 528 and the second outlet port 532 (i.e., between the pump outlet 514 and the bypass passage 536) and fluid communication is inhibited between the bypass inlet port 528 and the first outlet port 530 (i.e., between the pump outlet 514 and the inlet 534 of the hydraulic motor 520). In some embodiments, the compressor bypass valve 508 is selectively movable from the first position to the second position in response to activation/energization of the solenoid 524. In some embodiments, the compressor bypass valve 508 is selectively movable from the first position to the second position in response to a pneumatic or hydraulic control signal. In some embodiments, the compressor bypass valve 508 is selectively movable from the first position to the second position in response to the reservoir 522 reaching a full pressure threshold. In some embodiments, the compressor bypass valve 508 is a bi-stable valve is that movable discretely between the first position and the second position (i.e., either in the first positon or the second position). In some embodiments, the compressor bypass valve 508 is a proportional valve that is movable to an infinite number of positions between the first position and the second position (including the first position and the second position). This enables fluid flow to be simultaneously provided to the air compressor 506 and the steering gear 512 through the compressor bypass valve 508, and an amount of fluid flow provided to the air compressor 506 and to the steering gear 512 can be regulated by the position of the compressor bypass valve 508. In some embodiments, the hydraulic system 500 includes an orifice bypass that always provides fluid flow to the steering gear 512 and bypasses the compressor bypass valve 508.

The load sense valve 510 is arranged downstream of the pump outlet 514 between the supply passage 518 and the bypass passage 536. In the illustrated embodiment, the load sense valve 510 is a pilot-operated control valve that includes an inlet port 538 in fluid communication with the supply passage 518 (i.e., with the pump outlet 514) and an outlet port 540 in fluid communication with the bypass passage 536. In some embodiments, the load sense valve 510 is movable between a first load sense position and a second load sense position in response to a load sense pressure supplied to the load sense valve 510 (e.g., to a side of a spool or poppet included in the load sense valve 510). In some embodiments, the load sense valve 510 is normally biased into the first position by a spring 542. In the first load sense position, fluid communication is inhibited between the inlet port 538 and the outlet port 540 (i.e., between the pump outlet 514 and the bypass passage 536). With fluid flow being inhibited between the pump outlet 514 and the bypass passage 536 in the first load sense position, fluid flow is forced through the compressor bypass valve 508. In the second load sense position, fluid communication is provided between the inlet port 538 and the outlet port 540 (i.e., between the pump outlet 514 and the bypass passage 536). The load sense pressure is supplied to the load sense valve 510 by a pilot line 544 in fluid communication with a steering supply passage 546. In some embodiments, the pilot line 544 senses a pressure at an inlet workport 550 of the steering gear 512 and supplies that pressure to the load sense valve 510. In some embodiments, the load sense valve 510 is movable from the first load sense position to the second load sense position in response to the load sense pressure being greater than or equal to a load sense pressure threshold.

In some embodiments, the steering gear 512 includes the inlet workport 550 and an outlet workport 552. The inlet workport 550 is in fluid communication with the steering supply passage 546 and the outlet workport 552 is in fluid communication with the tank 504. In general, fluid flow in the steering supply passage 546 is provided to the inlet workport 550 to control steering operation of the vehicle via the steering gear 512. In some embodiments, the fluid flow through the inlet workport 550 and the outlet workport 552 control operation of the steering gear 512. In some embodiments, the steering gear 512 includes a steering valve 553 that controls the direction of fluid flow into and out of a double-rod steering actuator 554 to control the steering of the vehicle. For example, the steering valve 553 is selectively movable to connect one side of the double-rod steering actuator 554 to the inlet workport 550 and the other side of the double-rod steering actuator 554 to the outlet workport 552 and vice versa. The sides of the double-rod steering actuator 554 connected to the inlet workport 550 and the outlet workport 552 determine which way a piston 556 within the double-rod steering actuator 554 moves, which assists in steering the vehicle in a particular direction. For example, the steering gear 512 may be coupled to the tractive elements or wheel and tire assemblies 54 of the vehicles 10, 100, 200, 250, 300, 350, 400 of FIGS. 1-13.

In some embodiments, the bypass passage 536 provides fluid communication between the outlet port 540 of the load sense valve 510 and the steering supply passage 546. The steering supply passage 546 provides fluid communication between an outlet 548 of the hydraulic motor 520 and the inlet workport 550 of the steering gear 512. In some embodiments, the bypass passage 536 is connected to the steering supply passage 546 upstream of the inlet workport 550 and downstream of the outlet 548.

In some embodiments, a first relief valve 558 is in fluid communication with the supply passage 518 upstream of the load sense valve 510. The first relief valve 558 is configured to maintain a pressure within the supply passage 518 below a first pressure threshold. In some embodiments, a second relief valve 560 is in fluid communication with the bypass passage 536 downstream of the load sense valve 510. The second relief valve 560 is configured to maintain a pressure within the bypass passage below a second pressure threshold. In some embodiments, the second pressure threshold is lower than the first pressure threshold. In some embodiments, the second pressure threshold controls the maximum pressure supplied to the inlet workport 550.

Figure 15:
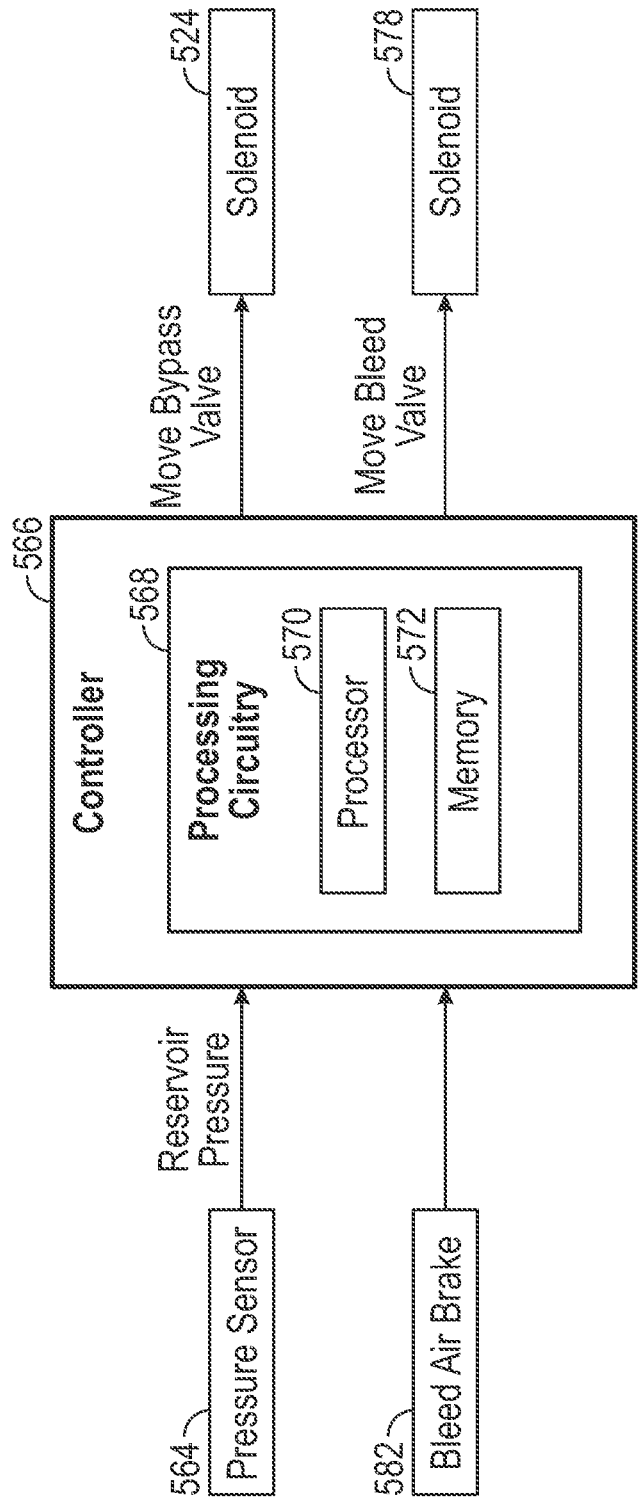
FIG. 15 is a block diagram of a controller of the hydraulic system of FIG. 14, according to an exemplary embodiment.

In some embodiments, the reservoir 522 is in fluid communication with an air brake 562 that is configured to control a braking function of the vehicle. In general, the pressurized air provided to the reservoir 522 by the air compressor 506 is supplied to the air brake 562 to slow down or stop (e.g., apply a braking force to) the tractive elements or wheel and tire assemblies 54 of the vehicle (e.g., the vehicles 10, 100, 200, 250, 300, 350, 400 of FIGS. 1-13). With reference to FIGS. 14 and 15, in some embodiments, a pressure sensor 564 is in communication with the reservoir 522 and configured to measure a pressure within the reservoir 522. A controller 566 is in communication with the pressure sensor 564 and the solenoid 524. In some embodiments, the controller 566 is configured to sense the pressure in the reservoir 522 measured by the pressure sensor 564 and determine if the pressure within the reservoir 522 is greater than or equal to a full pressure threshold. If the pressure within the reservoir 522 is greater than or equal to the full pressure threshold, the controller 566 is configured to energize the solenoid 524 (e.g., supplied the solenoid 524 with a current at a predefined magnitude and polarity). The solenoid 524 then generates a force that overcomes the force of the spring 526 to displace the compressor bypass valve 508 from the first position to the second position, which bypasses the hydraulic motor 520 and supplies all fluid flow from the pump 502 to the steering gear 512. In this way, for example, the hydraulic system 500 detects when the air compressor 506 fills the reservoir 522 with a predefined fill pressure (i.e., the pressure is greater than or equal to the full pressure threshold) and, in response, diverts fluid from the hydraulic motor 520, which powers the air compressor 506, to the steering gear 512.

In some embodiments, the controller 566 is a native controller on the vehicle that communicates over a vehicle CAN bus. In some embodiments, the controller 566 is a dedicated controller that is included on the vehicle to control operations of the hydraulic system 500. The controller 566 includes a processing circuit 568 having a processor 570 and memory 572. The processing circuit 568 can be communicably connected to a communications interface such that the processing circuit 568 and the various components thereof can send and receive data via the communications interface. The processor 570 can be implemented as a general purpose processor, an application specific integrated circuit ("ASIC"), one or more field programmable gate arrays ("FPGAs"), a group of processing components, or other suitable electronic processing components.

The memory 572 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 572 can be or include volatile memory or non-volatile memory. The memory 572 can include database components, object code components, script components, or any other type of information structure for supporting the various activities and information structures described in the present application. According to some embodiments, the memory 572 is communicably connected to the processor 570 via the processing circuit 568 and includes computer code for executing (e.g., by the processing circuit 568 and/or the processor 570) one or more processes described herein.

In some embodiments, a compressed air relief valve 574 is connected downstream of the air compressor 506 and is configured to maintain a pressure downstream of the air compressor 506 below a compressed air threshold. In some embodiments, a bleed valve 576 is connected downstream of the air compressor 506 and upstream of the reservoir 522. The bleed valve 576 includes a solenoid 578 that is configured to move the bleed valve 576 (e.g., in response to the controller 566 receiving a bleed air brake command 582 (see FIG. 15) and energizing the solenoid 578) to relieve the pressure downstream of the air compressor 506. In the illustrated embodiment, the bleed valve 576 is normally open. In some embodiments, the bleed valve 576 is normally closed. In the illustrated embodiment, a check valve 580 prevents the bleed valve 576 from draining the pressure within the reservoir 522. That is, the check valve 580 only allows fluid flow in a direction from the air compressor 506 to the reservoir 522.

Operation of the hydraulic system 500 will be described with reference to FIGS. 14 and 15. In some embodiments, the hydraulic system 500 is configured to operate in a normal mode where fluid flow is provided to the hydraulic motor 520 and the steering gear 512. For example, the pump 502 supplies fluid flow at a supply pressure from the pump outlet 514 to the supply passage 518. With the compressor bypass valve 508 in the first position, the fluid flow at the supply pressure is provided to the inlet 534 of the hydraulic motor 520, which powers the hydraulic motor 520 and operates the air compressor 506. The air compressor 506 generates compressed air that is supplied to the reservoir 522 and stored for use by the air brake 562. In some embodiments, the hydraulic motor 520 utilizes a first portion of the fluid flow at the supply pressure and a remaining portion of the fluid flow at a reduced pressure is provided from the outlet 548 of the hydraulic motor 520 to the inlet workport 550 of the steering gear 512 (e.g., through the steering supply passage 546) to assist steering operation of the vehicle. In this way, for example, the air compressor 506 and the steering gear 512 are provided with fluid flow from a common pump (i.e., the pump 502), which removes the need to utilize separate pumps or motors to operate these functions on the vehicle. This also provides flexibility in packaging size within the vehicle because of the reduced number of components required to operate the braking and steering-assisted functions on the vehicle. In the illustrated embodiment, the hydraulic motor 520 of the air compressor 506 and the steering gear 512 are supplied with fluid flow in series. In some embodiments, the hydraulic motor 520 of the air compressor 506 and the steering gear 512 are supplied with fluid flow in parallel. In general, with the air compressor 506 being hydraulically powered, the air compressor 506 and the steering gear 512 are capable of being supplied with fluid flow from a common pump either in a series arrangement or a parallel arrangement.

During operation, the air compressor 506 supplies the reservoir 522 with enough pressure to reach the full pressure threshold. In some embodiments, the full pressure threshold is sensed by the pressure sensor 564 and, in response, the controller 566 energizes the solenoid 524 of the compressor bypass valve 508 thereby moving the compressor bypass valve 508 to the second position where fluid communication is provided between the supply passage 518 and the bypass passage 536 and fluid communication between the supply passage 518 and the inlet 534 of the hydraulic motor 520 is inhibited. In this way, for example, the hydraulic motor 520 is bypassed and all fluid flow from the pump 502 is provided to the inlet workport 550 of the steering gear 512. In some embodiments, the compressor bypass valve 508 is hydraulically or pneumatically moved to the second position, rather than electronically via the controller 566.

In some embodiments, during operation, the steering demand increases to a point where fluid flow to the air compressor 506 is bypassed by the load sense valve 510. For example, during static steering operations (e.g., the vehicle is not moving or stationary), the steering load or demand (e.g., the amount of pressure required at the inlet workport 550 to move the double-rod steering actuator 554) increases to a point where fluid flow is required to be directly supplied to the steering gear 512 and the air compressor 506 needs to be bypassed. In general, during static steering operations, braking demand is low because the vehicle is not moving, and the pressure stored within the reservoir 522 is available to supply the air brake 562. In some embodiments, as steering demand increases, the load sense pressure sensed by the pilot line 544 becomes greater than or equal to the load sense pressure threshold. The load sense pressure becoming greater than or equal to the load sense pressure threshold provides a force on the load sense valve 510 that overcomes the force of the spring 542 and moves the load sense valve 510 from the first load sense position to the second load sense position. With the load sense valve 510 in the second load sense positon, fluid communication is provided between the supply passage 518 and the bypass passage 536, which supplies all fluid flow from the pump 502 to the steering gear 512 and bypasses the hydraulic motor 520. In this way, for example, the hydraulic system 500 is adaptive to the steering demand or load and is configured to actively bypass the hydraulic motor 520 and divert fluid flow to the steering gear 512 in response to a high steering demand or load.

In some embodiments, the hydraulic system 500 includes a secondary pump in communication with the supply passage 518 that provides redundancy backup in the event of a pump failure or malfunction. For example, the functionality of the hydraulic system to operate both braking and steering functions with a common pump enables a single backup pump to be utilized to provide redundancy backup for both the braking and steering functions, rather than requiring multiple pumps or motors be provided as backup for braking and steering functions (i.e., one backup for braking and another backup for hydraulic-assisted steering).

In the illustrated embodiments, the hydraulic system 500 first supplies fluid flow to the air compressor 506 and then to the steering gear 512, in the normal mode. In some embodiments, the hydraulic system 500 may first supply fluid flow to the steering gear 512 and then to the air compressor 506.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A hydraulic system for a vehicle comprising:
a pump including a pump outlet;
a tank configured to supply fluid to the pump;
a hydraulic motor coupled to an air compressor, the air compressor being configured to supply compressed air to an air brake;
a steering gear including an inlet workport and an outlet workport; and
a compressor bypass valve selectively movable between a first position where fluid flow is provided from the pump outlet to both the hydraulic motor and the inlet workport of the steering gear and a second position where the fluid flow from the pump outlet bypasses the hydraulic motor and is supplied to the inlet workport of the steering gear.

2. The hydraulic system of claim 1, further comprising a load sense valve arranged downstream of the pump outlet, wherein the load sense valve is configured to direct the fluid flow from the pump outlet to selectively bypass the hydraulic motor and supply the fluid flow from the pump outlet to the inlet workport in response to a pressure at the inlet workport being greater than or equal to a load sense pressure threshold.

3. The hydraulic system of claim 1, wherein the compressed air from the air compressor is supplied to a reservoir that is in communication with the air brake.

4. The hydraulic system of claim 3, further comprising a pressure sensor in communication with the reservoir and configured to measure a pressure within the reservoir.

5. The hydraulic system of claim 4, wherein the compressor bypass valve is configured to selectively move from the first position to the second position in response to the pressure sensor detecting that the reservoir reached a full pressure threshold.

6. The hydraulic system of claim 5, wherein the compressor bypass valve is an electrohydraulic valve that includes a solenoid.

7. The hydraulic system of claim 6, further comprising a controller in communication with the pressure sensor and the solenoid, wherein the controller is configured to selectively energize the solenoid in response to the pressure sensor detecting the full pressure threshold.

8. An electrified vehicle comprising:
a chassis;
two or more wheels coupled to the chassis;
an energy storage device supported on the chassis;
two or more drive motors, each being electrically coupled to the energy storage device and being configured to provide rotational energy to a respective one of the two or more wheels; and a hydraulic system including:
   a pump including a pump outlet;
   a tank configured to supply fluid to the pump;
   a hydraulic motor coupled to an air compressor, the air compressor being configured to supply compressed air to an air brake that is configured to selectively apply a braking force to the two or more wheels;
   a steering gear including an inlet workport and an outlet workport, wherein the steering gear is coupled to the two or more wheels to control a steering direction of the two or more wheels; and
   a compressor bypass valve selectively movable between a first position where fluid flow is provided from the pump outlet to both the hydraulic motor and the inlet workport of the steering gear and a second position where the fluid flow from the pump outlet bypasses the hydraulic motor and is supplied to the inlet workport of the steering gear.

9. The electrified vehicle of claim 8, wherein the hydraulic system includes a load sense valve arranged downstream of the pump outlet, and wherein the load sense valve is configured to direct the fluid flow from the pump outlet to selectively bypass the hydraulic motor and supply the fluid flow from the pump outlet to the inlet workport in response to a pressure at the inlet workport being greater than or equal to a load sense pressure threshold.

10. The electrified vehicle of claim 8, wherein the compressed air from the air compressor is supplied to a reservoir that is in communication with the air brake.

11. The electrified vehicle of claim 10, further comprising a pressure sensor in communication with the reservoir and configured to measure a pressure within the reservoir.

12. The electrified vehicle of claim 11, wherein the compressor bypass valve is configured to selectively move from the first position to the second position in response to the pressure sensor detecting that the reservoir reached a full pressure threshold.

13. The electrified vehicle of claim 12, wherein the compressor bypass valve is an electrohydraulic valve that includes a solenoid.

14. The electrified vehicle of claim 13, further comprising a controller in communication with the pressure sensor and the solenoid, wherein the controller is configured to selectively energize the solenoid in response to the pressure sensor detecting the full pressure threshold.

15. A method of controlling steering and braking functions on an electrified vehicle, the method comprising:
   supplying pressurized hydraulic fluid at a supply pressure from a pump to a hydraulic motor through a compressor bypass valve;
   powering, via the hydraulic motor using a first portion of the supply pressure, an air compressor that supplies compressed air to an air brake;
   supplying a remaining portion of the supply pressure from the hydraulic motor to a steering gear.

16. The method of claim 15, further comprising:
   detecting, via a pressure sensor, that a reservoir in communication with the air brake reaches a full pressure threshold;
   in response to detecting that the reservoir reaches the full pressure threshold, actuating the compressor bypass valve to bypass the hydraulic motor and provide the supply pressure to the steering gear.

17. The method of claim 16, wherein actuating the compressor bypass valve comprises:
   energizing a solenoid coupled to the compressor bypass valve.

18. The method of claim 15, further comprising:
   detecting, via a pilot line, a pressure upstream of the steering gear.

19. The method of claim 18, further comprising:
   supplying the pressure upstream of the steering gear to a load sense valve arranged downstream of the pump.

20. The method of claim 19, further comprising:
   actuating the load sense valve to bypass the hydraulic motor and provide the supply pressure to the steering gear, in response to the pressure upstream of the steering gear being greater than or equal to a load sense pressure threshold.

\* \* \* \* \*